United States Patent [19]

Usamoto et al.

[11] 3,962,155
[45] June 8, 1976

[54] MOLDED FOAMS AND PROCESS FOR PRODUCING THE SAME

[75] Inventors: Teruyoshi Usamoto, Higashi-Osaka; Kozo Tsuji, Ibaragi; Takami Sato, Toyonaka, all of Japan

[73] Assignees: Sumitomo Chemical Company, Limited, Osaka; Hayashibara Biochemical Laboratories, Incorporated, both of Japan

[22] Filed: Jan. 20, 1975

[21] Appl. No.: 542,686

[30] Foreign Application Priority Data
Feb. 6, 1974   Japan............................... 49-15636

[52] U.S. Cl............................. 260/2.5 R; 106/122; 260/2.5 H; 260/2.5 F; 260/874; 260/2.5 E; 260/2.5 N; 260/2.5 P
[51] Int. Cl.².............................................. C08J 9/00
[58] Field of Search........... 260/2.5 E, 2.5 R, 2.5 N, 260/2.5 P, 2.5 H, 2.5 F, 874; 106/122

[56] References Cited
OTHER PUBLICATIONS
Chem. Abs., 8th col.; 7th col.
*Plastic Foams*, Frisch et al.
Plastic Foams, I & II, Benning.

Primary Examiner—Murray Tillman
Assistant Examiner—T. DeBenedictis, Sr.
Attorney, Agent, or Firm—Stevens, Davis, Miller & Mosher

[57] ABSTRACT

A molded foam can be easily obtained by blending pullulan, modified pullulan or a mixture thereof with a foaming agent capable of yielding a gas at below the decomposition temperature thereof, and, if necessary, with a plasticizer or softener, and then molding the resulting mixture according to a conventional thermoplastic resin-molding process at a temperature at which the said pullulan, modified pullulan or mixture thereof is in a plastified state, and at a temperature above the gas-yielding temperature of said foaming agent and below the decomposition temperature of said pullulan, modified pullulan or mixture thereof. The molded foam thus obtained is not only well comparable in mechanical, chemical and physical properties to molded foams composed of conventional thermoplastic synthetic resins, but also has such excellent characteristics that it can spontaneously be decomposed on standing outdoors, and hence can be easily discarded without any such fear as to cause environmental pollution.

21 Claims, No Drawings

MOLDED FOAMS AND PROCESS FOR PRODUCING THE SAME

This invention relates to a molded foam composed of pullulan, modified pullulan or a mixture thereof, and to a process for producing the same.

Because of their specific properties, molded foams composed of thermoplastic synthetic resins, e.g. polyolefin type, polystyrene type and polyvinyl chloride type resins, have heretofore been put into various uses such as leathers, sheets, containers, furniture materials, soundproof materials, heat insulating materials, packaging materials, buffer materials, matting materials, etc. These foams, however, are too physically and chemically stable to decay by spontaneous decomposition, and are quite difficultly discarded after use so that the discarding treatment thereof has become even a social problem as one of the problems concerning public pollution. For example, when the foams are discarded for land reclamation, depression of the land surface will be caused; when disposed by combustion, secondary public pollution due to formation of large quantities of poisonous gases and damage of incinerators due to generation of enormous heat will be brought about; and when desired to be regenerated, much costs will be required for the regeneration treatment. In order to settle the above-mentioned drawbacks, many attempts have been made to decompose the foams with the sunlight by incorporating light decomposition promoters into the foams. However, when the foams are shielded from the sunlight, e.g. when the foams have been put in the shade or buried in the ground, they are not decomposed but are left as they are. In view of the above, and the high costs and toxicity of the decomposition promotors, it is the actual state that said decomposition promoters are scarcely utilized. Accordingly, there has strongly been desired in the application field of foams the advent of molded foams which can be easily discarded without causing any public pollution and which are equivalent or superior in properties to the conventional thermoplastic synthetic resin forms.

With an aim to solve the above-mentioned problems, the present inventors conducted extensive studies and found a molded foam free from the aforesaid drawbacks, and a process for producing the same. Based on the above finding, the inventors have accomplished the present invention.

An object of the present invention is to provide a novel molded foam which can be easily discarded without causing any environmental pollution and which has such characteristic properties as being equivalent or superior to those of the conventional thermoplastic synthetic resin foams.

Another object of the invention is to provide a process for producing the above-mentioned molded foam.

Other objects and advantages of the invention will become apparent from the following description.

That is, the inventors have found that a molded foam composed of pullulan, modified pullulan or a mixture thereof is comparable in mechanical, chemical and physical properties to a molded foam composed of conventional thermoplastic synthetic resin, spontaneously decays when allowed to stand outdoors, absorbs water in a wet place or in the ground, is gradually decomposed by microorganisms, and does not generate any poisonous gases nor intense heat at all even when burned and thus causes no public pollution; and that a molded foam composed of pullulan, modified pullulan or a mixture thereof is easily produced by blending pullulan, modified pullulan or a mixture thereof with a foaming agent capable of yielding a gas at below the decomposition temperature of said pullulan, modified pullulan or a mixture thereof, and, if necessary with a plasticizer or softener, and then molding the resulting mixture at a temperature at which said pullulan, modified pullulan or a mixture thereof is in a plastified state, and at a temperature above the gas-yielding temperture of said foaming agent and below the decomposition temperature of said pullulan, modified pullulan or a mixture thereof.

The pullulan used in the present invention is, as is well known, a glucan which is obtained as a slime secreted in a culture liquor formed by culturing a pullulan-producing strain, e.g. *Pullularia pullulans*, in a medium containing sucrose, starch syrup or glucose as a carbon source, and is represented by the formula,

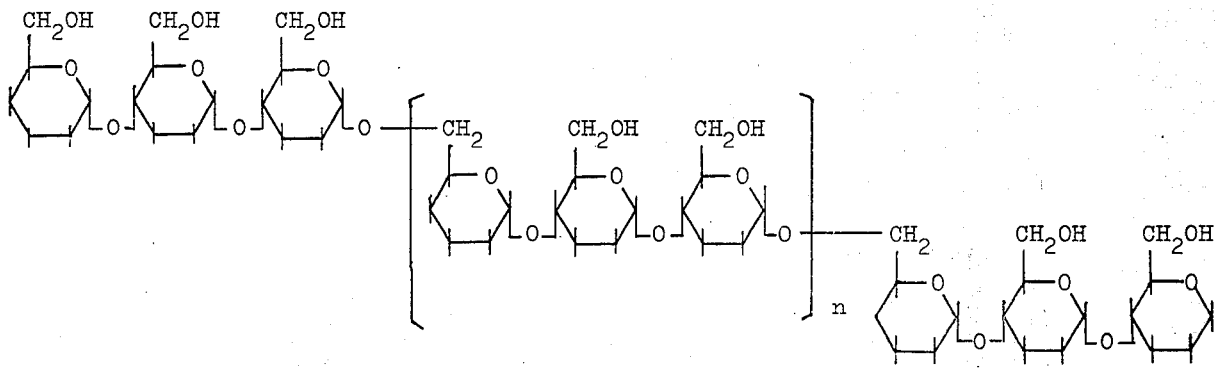

wherein $n$ is an integer of 20 to 10,000 (H. Bender, J. Lehmann et al.: *Biochem. Biophys. Acta*, 36,309 (1959); Seinosuke Ueda: Kogyo Kagaku Zasshi (*Journal of the Chemical Society of Japan, Industrial Chemistry Section*), 67, 757, (1964)). While pullulan has a molecular weight within such a broad range as from 10,000 to 5,000,000, the molecular weight of the pullulan used in the present invention is preferably 50,000 to 1,000,000.

The modified pullulan referred to in the present invention is a compound prepared by subjecting said pullulan to acetylation, hydroxyacetylation, dialdehydation, nitration, carboxyalkylation, esterification with an aliphatic or aromatic carboxylic acid, alkyletherification, hydroxyalkyl-etherification or carboxyalkyl-etherification, or is a graft copolymer prepared by grafting a vinyl compound on the pullulan. The substitution degree of the modified pullulan may be optional.

In the present invention, there may also be used a mixture of said pullulan and modified pullulan which may further be incorporated with polyvinyl alcohol, high molecular weight amylose or gelatin.

Examples of the plasticizer or softener which may be incorporated into said pullulan, modified pullulan are polyhydric alcohols such as glycerin, ethylene glycol, polyethylene glycol, sorbitol, propylene glycol, polypropylene glycol and maltitol, and dimethyl sulfoxide and water and the like. The amount of the plasticizer or softener is 1 to 50 weight % based on the weight of the said pullulan, modified pullulan or a mixture thereof.

In the present invention, the pullulan or modified pullulan or a mixture thereof may additionally be incorporated with any of pigments, dyes, fillers, stabilizers, flame retardants, etc.

The foamed ratio of the molded foam of the present invention varies depending on the application purpose of the molded foam, but is ordinarily in the range of 1 to 30 times the original volume.

The molded foam referred to in the present invention is one in the form of film, sheet, block, rod, fiber, hollow member or the like, and is used as sheet, soundproof material, heat-insulating material, buffer material, packaging material, container or the like.

The molded foam of the present invention may be soft or hard in touch and may be low or high in foamed degree, and such touch and foamed degree may be freely controlled, according to the application purpose of the resulting foam, by properly selecting the modification manner and substitution degree of pullulan, the kind and amount of plasticizer or softener added, and the foamed degree of finally obtained foam.

The decomposition temperature of pullulan or modified pullulan, referred to in the present invention, means a temperature at which the pullulan or modified pullulan, when heated, initiates to gradually decrease in weight due to dehydration phenomenon. The decomposition temperature of pullulan is in the range of 250° to 260°C., while that of modified pullulan is in the range of 170° to 300°C., though this varies depending on the modification manner and substitution degree of the modified pullulan. The temperature at which pullulan or modified pullulan is in a plastified state, referred to in the present invention, varies depending on the molecular weight, modification manner and substitution degree of pullulan and the kind and amount of plasticizer or softener added, but can freely be controlled ordinarily in the range from 40°C. to the decomposition temperature. If pullulan or modified pullulan is molded at above the decomposition temperature thereof, thermal decomposition or carbonization takes place to give no molded foam.

The foaming agent to be used in the present invention may be any of heat-decomposable solid foaming agent, volatile liquid foaming agent and gaseous foaming agent. However, the foaming agent should be inert in such a sense as not to react with pullulan or modified pullulan under the molding conditions, and should be able to yield a gas or in the form of a gas at a temperature in the range of plasticization temperature and decomposition temperature of pullulan or modified pullulan, though it is needless to say that the foaming agent is gaseous at the molding temperature.

Solid foaming agents suitable for use in the present invention are organic solid foaming agents such as dinitroso pentamethylene-tetramine, azodicarbonamide, azobisisobutyronitrile and p,p-hydroxybenzenesulfonyl hydrazide, and similar azo compounds, e.g. diazo aminobenzene, barium azodicarboxylate and azocyclohexyl nitrile, etc. which decomposes at below the molding temperature. Such organic solid foaming agent is preferably incorporated into pullulan or modified pullulan in a proportion of 0.1 to 30 weight % based on the weight of the pullulan, modified pullulan, or a mixture thereof. Alternatively, there may also be used, as solid foaming agents yielding carabon dioxide and water, organic acids such as citric, tartaric, diglycolic and oxalic acid, and inorganic salts such as sodium carbonate, potassium carbonate, sodium bicarbonate and potassium bicarbonate. However, these foaming agents are desirably used as auxiliary foaming agents to make the foams uniform and fine and to impart brightness and softness to the final products. Such foaming agent is preferably incorporated into pullulan, modified pullulan or a mixture thereof in a proportion in the range of 0.1 to 5%. Even if the gas-yielding temperature of the above-mentioned solid foaming agent is higher than the decomposition temperature of pullulan or modified pullulan, the foaming agent can be lowered in gas-yielding temperature when used in combination with a proper foaming assistant, and thus can successfully be used in the present invention.

The foaming assistant to be used in the present invention includes organic and inorganic metal salts, such as, lead stearate, tribasic lead sulfate, dibasic lead phosphite, cadmium stearate, barium stearate, calcium stearate, zinc stearate, zinc oxide, anhydrous zinc sulfate, dibutyl tin dilaurate, dibutyl tin maleate; and ethylene glycol, urea and the like. The foaming assistant is added in a proportion of 0.1 to 10 weight % based on the weight of the pullulan, modified pullulan or mixture thereof. When the foaming assistant is used in combination with the foaming agent, the following lowering effect can be seen in the gas-yielding temperature of the foaming agent: When 1 part by weight of lead stearate is used as foaming assistant with 5 parts by weight of azodicarbonamide as foaming agent, the gas-yielding temperature of the latter is lowered to 170°C – 180°C and when tribasic lead sulfate is used in the same part as above in place of lead stearate, the gas-yielding temperature of said foaming agent is lowered to 140° – 160°C, while the gas-yielding temperature of said foaming agent itself is 200° – 220°C.

Volatile liquid foaming agents suitable for use in the present invention are low boiling point aliphatic ketones such as acetone and methylethylketone; low boiling point esters such as ethyl acetate, methyl acetate, methyl formate and ethyl formate; aliphatic lower alcohols such as methanol and ethanol; normally liquid low boiling point hydrocarbons such as pentane, hexane, heptane, petroleum ether, cyclopentane and cyclopentadiene; halogen-containing normally liquid volatile hydrocarbons such as methyl chloride, ethyl chloride, chloroform and methylene bromide; and water. The proportion of the volatile liquid foaming agent to be incorporated into pullulan, modified pullulan or a mixture thereof is preferably 1 to 10 weight %.

Gaseous foaming agents suitable for use in the present invention are normally gaseous compounds such as nitrogen, carbon dioxide, helium, methane, ethane, propane, butane, ethylene and propylene, and gaseous halogenated hydrocarbons such as tetrafluoromethane, trifluoromethane, dichlorodifluoromethane, hexafluoroethane, 1,1-difluoroethane and the like. The proportion of the gaseous foaming agent to be incorporated into pullulan, modified pullulan or a mixture thereof is 0.5 to 30 weight %, preferably 1 to 10 weight %.

In the process of the present invention, any of the above-mentioned solid foaming agents, volatile liquid foaming agents and gaseous foaming agents may be used in combination. The proportion of the foaming agent to be incorporated may be properly decided according to the desired foamed ratio of the resulting molded foam and the kind of the foaming agent.

In the present invention, a core material may additionally be incorporated into pullulan, modified pullulan or a mixture thereof in order to make the resulting molded foam fine and uniform in size of foams constituting the molded foam. Preferable core materials are metal oxides such as silica, titania, alumina, barium oxide and magnesium oxide; and metal salts such as sodium chloride, potassium bromide, magnesium phosphate, barium sulfate, aluminum sulfate, boron nitrate and magnesium silicate, e.g. talc; which have been finely divided to a size of 0.01 to 5 microns. The proportion of the core material to be incorporated is preferably in the range of 0.1 to 5 weight %.

According to the present invention, the foaming agent may be incorporated into pullulan, modified pullulan or a mixture thereof by adoption of any conventional process employed in the case of thermoplastic synthetic resin. That is, there may be adopted a process in which a composition comprising pullulan, modified pullulan or a mixture thereof and the foaming agent is previously formed and then used as a starting material for the production of a molded foam, or a process in which the foaming agent is introduced into the molding machine during the molding of pullulan, modified pullulan or a mixture thereof.

In case the foaming agent is a heat-decomposable solid foaming agent, it may be blended with pullulan, modified pullulan or a mixture thereof which has been plastified by means of an extruder or a mixing roll at a temperature below the decomposition temperature of said foaming agent. In case the foaming agent is a volatile liquid foaming agent, it may be permeated under pressure into pullulan, modified pullulan or a mixture thereof or may be injected under pressure into the plastified resin in the barrel of a screw type extruder or injection molding machine. Further, in case the foaming agent is a gaseous foaming agent, it may be injected into the plastified resin in the barrel of a screw type extruder or injection molding machine, like in the case of the volatile liquid foaming agent.

For production of the molded article according to the process of the present invention, there may be adopted any of such molding procedure as extrusion molding using a screw type extruder, injection molding using a screw type injection molding machine, blow molding using a blow molding machine, or press molding using a press molding machine, and a suitable molding procedure may be selected and employed according to the desired shape and uses of the resulting molded foam. In any case, a homogeneous mixture comprising the resin plastified within the molding machine and the gas yielded from the foaming agent, which mixture is maintained under a high pressure, is extruded, injected or liberated from the molding machine into such a low pressure zone as the atmospheric, whereby the gas is expanded to give a molded foam.

The present invention is illustrated in detail below with reference to examples, but the examples are by way of illustration and not by way of limitation. In the examples, all parts are by weight.

EXAMPLE 1

20 Parts of water was uniformly absorbed in 100 parts of dry pullulan powder (molecular weight: 50,000). The resulting mixture was fed to the hopper of an extruder (50 mm in diameter, L/D = 22), while adding to the mixture 0.5 part of sodium bicarbonate and 0.4 part of citric acid. Subsequently, the mixture was heated to 150°C., while being kneaded and conveyed within the extruder, and was sufficiently plastified. Into the thus plastified pullulan mixture, which was being conveyed within the extruder, 5 parts of pentane was injected under a pressure of 10 kg/cm$^2$ through a foaming agent-injecting hole provided in the barrel, and the resulting mixture was sufficiently kneaded. Thereafter, the plastified pullulan mixture was continuously extruded into air through a die kept at 110°C, which had been so connected to the tip of the extruder as to form a foamed pullulan sheet of 10 mm. in thickness, whereby a foamed pullulan sheet was obtained. This sheet had a foamed ratio of about 30 times the original volume, and was similar to a highly foamed sheet of polystyrene.

EXAMPLE 2

100 Parts of acetylated pullulan powder (molecular weight before acetylation: 35,000) having a substitution degree of 1.1 and a softening temperature of 125°C. was dry-blended by means of a super mixer with 2 parts of azodicarbonamide as a foaming agent, 0.75 part of zinc stearate as a foaming assistant and 5 parts of calcium carbonate as a foam core-forming agent. The resulting blend was injection-molded into a box-like molded article by use of an injection molding machine (injection capacity 10 oz.) under conditions of a barrel temperature of 200°C., an injection pressure of 500 kg/cm$^2$, an injection speed of 800 cc/sec., and a mold temperature of 30°C., whereby a molded article having a foamed ratio of 3 times with a grain-patterned appearance was obtained.

EXAMPLE 3

30 Parts of water was uniformly absorbed in 100 parts of dry pullulan powder (molecular weight: 300,000). The resulting mixture was homogeneously blended with 5 parts of calcium carbonate, and then hot-pressed at 90°C. under a pressure of 100 kg/cm$^2$ to prepare a sheet of 1 mm. in thickness. This sheet was held under pressure between two pressing plates of a hot press, and heated to 180°C. Thereafter, the pressure of the press was released so as to make the gap between the two pressing plates 2 mm., and then the sheet was allowed to cool to room temperature. The thus obtained sheet had a thickness of 2 mm. and a foamed ratio of about 2 times, and was uniform in size of foams.

What is claimed is:

1. A molded article comprising foamed pullulan, foamed modified pullulan prepared by subjecting pullulan to acetylation, hydroxyacetylation, dialdehydation, nitration, carboxyalkylation, esterification with an aliphatic or aromatic carboxylic acid, alkyl-etherification, hydroxyalkyl-etherification or carboxyalkyl-etherification, or is a graft copolymer prepared by grafting a vinyl compound on pullulan, or a foamed mixture thereof.

2. A molded foam according to claim 1, which is in the form of a film, sheet, block, rod, fiber or hollow member.

3. A molded foam according to claim 1, which is used as a sheet, soundproof material, heat-insulating material, buffer material, packaging material or container.

4. A process for producing a molded foam composed of pullulan, modified pullulan or a mixture thereof, characterized by blending pullulan, modified pullulan or a mixture thereof with a foaming agent capable of yielding a gas at below the decomposition temperature thereof, and then molding the resulting mixture at a temperature at which said pullulan, modified pullulan or mixture thereof is in a plastified state, and at a temperature above the gas-yielding temperature of said foaming agent and below the decomposition temperature of said pullulan, modified pullulan or mixture thereof, wherein the modified pullulan is a compound prepared by subjecting pullulan to acetylation, hydroxyacetylation, dialdehydation, nitration, carboxylalkylation, esterification with an aliphatic or aromatic carboxylic acid, alkyl-etherification, hydroxyetherification or carboxylalkyl-etherification, or is a graft copolymer prepared by grafting a vinyl compound on pullulan.

5. A process according to claim 4, wherein the molecular weight of the pullulan is 50,000 to 1,000,000.

6. A process according to claim 4, wherein the foaming agent is at least one member selected from the group consisting of solid foaming agents, volatile liquid foaming agents and gaseous foaming agents.

7. A process according to claim 6, wherein the solid foaming agent is an organic solid foaming agent, and is used in a proportion of 0.1 to 30 weight % based on the weight of the pullulan, modified pullulan or mixture thereof.

8. A process according to claim 7, wherein the organic solid foaming agent is dinitroso-pentamethylenetetramine, azodicarbonamide, azobisisobutyronitrile, p,p-hydroxybenzenesulfonyl hydrazide, diazo aminobenzene, barium azodicarboxylate and azocyclohexyl nitrile.

9. A process according to claim 7, wherein a solid foaming agent composed of an organic acid or an inorganic salt is used as an auxiliary foaming agent in a proportion of 0.1 to 5 weight % based on the weight of the pullulan, modified pullulan or mixture therof.

10. A process according to claim 9, wherein the organic acid is citric, tartaric, diglycolic or oxalic acid, and the inoganic salt is sodium carbonate, potassium carbonate, sodium bicarbonate or potassium bicarbonate.

11. A process according to claim 6, wherein the volatile liquid foaming agent is acetone, methylethylketone, methyl acetate, ethyl acetate, methyl formate, ethyl formate, methanol, ethanol, pentane, hexane, heptane, petroleum ether, cyclopentane, cyclopentadiene, methyl chloride, ethyl chloride, chloroform, methylene bromide or water, and is used in a proportion of 1 to 10 weight % based on the weight of the pullulan, modified pullulan or mixture thereof.

12. A process according to claim 6, wherein the gaseous foaming agent is nitrogen, carbon dioxide, helium, methane, ethane, propane, butane, ethylene, propylene, tetrafluoromethane, dichlorodifluoromethane, hexafluoroethane or 1,1-difluoroethane and is used in a proportion of 1 to 10 weight % based on the weight of the pullulan, modified pullulan or mixture thereof.

13. A process according to claim 4, wherein the pullulan, modified pullulan or mixture thereof is additionally blended with a core material used in a proportion of 0.1 to 5 weight % based on the weight of the pullulan, modified pullulan or mixture thereof.

14. A process according to claim 13, wherein the core material is silica, titania, alumina, barium oxide, magnesium oxide, sodium chloride, potassium bromide, magnesium phosphate, barium sulfate, aluminum sulfate, boron nitrate or magnesium silicate of 0.01 to 5 microns in size.

15. A process according to claim 4, wherein the pullulan, modified pullulan or mixture thereof is additionally blended with polyvinyl alcohol, high molecular weight amylose or gelatin.

16. A process according to claim 4, wherein the pullulan, modified pullulan or mixture thereof is blended with 1 to 50 weight % of glycerin, ethylene glycol, polyethylene glycol, sorbitol, propylene glycol, polypropylene glycol, maltitol, dimethyl sulfoxide or water as a plasticizer or softener.

17. A process according to claim 4, wherein the decomposition temperature of the pullulan is 250° to 260°C., and the decomposition temperature of the modified pullulan is 170° to 300°C.

18. A process according to claim 4, wherein the plasticization temperature of the pullulan, modified pullulan or mixture thereof is in the range of 40°C. to the decomposition temperature thereof.

19. A process according to claim 4, wherein the pullulan, modified pullulan or mixture thereof is molded by use of a screw type extruder, a screw type injection molding machine, a blow molding machine or a press molding machine.

20. A process according to claim 7, wherein a foaming assistant is added in a proportion of 0.1 to 10 weight % based on the weight of the pullulan, modified pullulan or mixture thereof.

21. A process according to claim 20, wherein the forming assistant is lead stearate, tribasic lead sulfate, dibasic lead phosphite, cadmium stearate, barium stearate, calcium stearate, zinc stearate, zinc oxide, anhydrous zinc sulfate, dibutyl tin dilaurate, dibutyl tin maleate, ethylene glycol, or urea.

* * * * *